(12) United States Patent
Ahn et al.

(10) Patent No.: US 8,841,927 B2
(45) Date of Patent: Sep. 23, 2014

(54) TOUCH SENSING CIRCUIT

(75) Inventors: Yong Sung Ahn, Ansan-si (KR); Jung Min Choi, Daejeon-si (KR); Yong Suk Kim, Daegu-si (KR); Hyung Seog Oh, Daejeon-si (KR)

(73) Assignee: Silicon Works Co., Ltd., Daejeon-Si (KR)

( * ) Notice: Subject to any disclaimer, the term of this patent is extended or adjusted under 35 U.S.C. 154(b) by 236 days.

(21) Appl. No.: 13/287,607

(22) Filed: Nov. 2, 2011

(65) Prior Publication Data

US 2012/0268144 A1    Oct. 25, 2012

(30) Foreign Application Priority Data

Apr. 21, 2011  (KR) .................. 10-2011-0037324

(51) Int. Cl.
*G01R 27/26* (2006.01)
*G06F 3/044* (2006.01)
*G01R 23/20* (2006.01)
*G06F 3/041* (2006.01)

(52) U.S. Cl.
CPC .................................... *G06F 3/044* (2013.01);
*G06F 3/0416* (2013.01)
USPC ............ 324/679; 324/620; 345/173; 345/174

(58) Field of Classification Search
CPC ......... G06F 3/044; G06F 3/041; G01R 23/20; H04B 15/00
USPC ................. 324/620, 679; 345/173, 174, 168; 327/512; 341/166
See application file for complete search history.

(56) References Cited

U.S. PATENT DOCUMENTS

| | | | | |
|---|---|---|---|---|
| 7,880,661 | B2 * | 2/2011 | Jeong et al. | 341/166 |
| 8,179,148 | B2 * | 5/2012 | Fukuda et al. | 324/620 |
| 2008/0054987 | A1 * | 3/2008 | Choi et al. | 327/512 |
| 2008/0180300 | A1 * | 7/2008 | Jeong et al. | 341/166 |
| 2012/0062464 | A1 * | 3/2012 | Otagaki et al. | 345/168 |
| 2012/0062498 | A1 * | 3/2012 | Weaver et al. | 345/174 |
| 2012/0206154 | A1 * | 8/2012 | Pant et al. | 324/613 |

FOREIGN PATENT DOCUMENTS

| | | |
|---|---|---|
| JP | 2009-76237 | 4/2009 |
| KR | 10-2006-0052989 | 5/2006 |
| KR | 10-2009-0004090 | 1/2009 |
| KR | 10-2010-0088165 | 8/2010 |

\* cited by examiner

*Primary Examiner* — Arleen M Vazquez
*Assistant Examiner* — Neel Shah
(74) *Attorney, Agent, or Firm* — Kile Park Reed & Houtteman PLLC

(57) ABSTRACT

A touch sensing circuit detects a difference in variation of coupling capacitances between mutually adjacent driving electrodes through the use of a differential amplifier, and senses whether or not a touch is made on a touch screen panel, thereby being capable of removing display noise.

12 Claims, 5 Drawing Sheets

(a)                      (b)

TOUCH SENSING CIRCUIT

BACKGROUND OF THE INVENTION

1. Field of the Invention

The present invention relates to a touch sensing circuit, and more particularly, to a touch sensing circuit which can sense whether or not a touch is made on the touch screen panel by detecting a difference in variation of coupling capacitances between mutually adjacent driving electrodes when a finger is touched on a touch screen panel.

2. Description of the Related Art

With miniaturization of electronic devices, a touch screen panel (TSP) is widely used as an input device. A TSP is provided on the rear side thereof with a display unit, an image or the like outputted from the display unit is transmitted through the TSP and then is shown to the user, and a corresponding electronic device performs a user's instruction when the user touches the TSP and applies the instruction while seeing the image or the like.

Such a TSP shows a tendency to use a capacitance scheme in order to detect an input position on the TSP. The capacitance scheme is to generate a minute variation in instantaneous current through capacitance when the user touches his/her finger to a dielectric film formed on electrodes of a TSP, and to enable a touched position to be detected from the minute change.

Meanwhile, according to such a capacitance type touch screen panel (TSP), even when the user uses the TSP in a multi-touch manner as touching a plurality of points through a plurality of fingers at the same time, the plurality of points can be recognized at the same time.

FIG. 1 is a view illustrating the configuration of a conventional capacitance type touch sensing device.

Referring to FIG. 1, a capacitance type touch sensing device 100 includes a touch screen panel 110 and a detection means 120. The touch screen panel 110 includes a plurality of driving electrodes 111a to 111n, which are extended in a row direction and are connected to a plurality of sensing channels 112a to 112n, and a plurality of receiving electrodes 113a to 113n, which are extended in a column direction and are connected to a plurality of sensing channels 114a to 114n.

The plurality of driving electrodes 111a to 111n and the plurality of receiving electrodes 113a to 113n are arranged on mutually different planes, and include parasitic impedances, such as parasitic resistance Rp and parasitic capacitance Cp1. Also, in each node where the plurality of driving electrodes 111a to 111n and the plurality of receiving electrodes 113a to 113n cross each other, a coupling capacitance Cc is formed. Therefore, the plurality of driving electrodes 111a to 111n, the coupling capacitance Cc, and the plurality of receiving electrodes 113a to 113n form a detection path where a variation in coupling capacitance is detected.

In this case, when one of the plurality of driving electrodes 111a to 111n is touched by the user, a variation in coupling capacitance Cc between the touched driving electrode and a receiving electrode which crosses the touched driving electrode is generated, so that it is possible to determine whether or not the touch screen panel 110 is touched by sensing the variation through the detection means 120.

FIG. 2 is a view illustrating the structure of a touch screen panel.

Generally, touch screen panels (TSPs) are classified into add-on type and on-cell type according to forms in which display panels are installed.

In FIG. 2, (a) is a view illustrating the configuration of an add-on type touch screen panel, and (b) is a view illustrating the configuration of an on-cell type touch screen panel.

As shown in (a) of FIG. 2, an add-on type touch screen panel (TSP) has a structure in which a TFT substrate 11, a color filter substrate 12, an insulating layer 13, a touch screen substrate 14, and a tempered glass substrate 15 are formed in regular sequence.

In contrast, as shown in (b) of FIG. 2, an on-cell type touch screen panel (TSP) has a structure in which a touch screen substrate 14 is formed directly on top of a color filter substrate 12, without an insulating layer.

The structure of the on-cell type touch screen panel (TSP) has an advantage in that the entire thickness of the panel can be reduced. However, as compared with the add-on type touch screen panel (TSP), the on-cell type touch screen panel (TSP) is vulnerable to display noise and peak noise because the touch screen substrate 14 gets near to the TFT substrate 11, on which a display driving circuit is formed.

As shown in (c) of FIG. 2, various parasitic capacitances $C_S$, $C_G$, and $C_{COM}$, are generated between the driving electrodes of the touch screen substrate 14 and the source line, gate line, and intermediate voltage lines of the TFT substrate 11. However, the on-cell type touch screen panel (TSP) has a problem in that the various parasitic capacitances $C_S$, $C_G$, and $C_{COM}$ further increase in magnitude because the touch screen substrate 14 and the TFT substrate 11 get near to each other.

SUMMARY OF THE INVENTION

Accordingly, the present invention has been made in an effort to solve the problems occurring in the related art, and an object of the present invention is to provide a touch sensing circuit which detects a difference in variation of coupling capacitances between mutually adjacent driving electrodes through the use of a differential amplifier in an on-cell type touch screen panel structure, and senses whether or not a touch is made on the touch screen panel, thereby being capable of removing display noise.

In order to achieve the above object, according to one aspect of the present invention, there is provided a touch sensing circuit for sensing a coupling capacitance value changed by a touch with respect to a touch screen panel, which includes a plurality of driving electrodes and a plurality of receiving electrodes and is provided with a coupling capacitance in a node where the driving electrodes and the receiving electrodes cross each other, and sensing whether a touch is made on the touch screen panel, the touch sensing circuit including: a differentiator configured to receive a driving signal applied to a first driving electrode and a driving signal applied to a second driving electrode, which is adjacent to the first driving electrode, and to generate a first differentiated signal and a second differentiated signal; an amplifier configured to receive the first differentiated signal and the second differentiated signal, and to output a amplified signal out_amp; and a detector configured to receive the differentially amplified signal and to output a detection signal, wherein the touch sensing circuit senses whether a touch is made on the touch screen panel by sensing a difference in variation between a first coupling capacitance and a second coupling capacitance, in which the first coupling capacitance is formed in a node where the first driving electrode and a first receiving electrode cross each other, and the second coupling capacitance is formed in a node where the second driving electrode and a second receiving electrode cross each other.

BRIEF DESCRIPTION OF THE DRAWINGS

The above objects, and other features and advantages of the present invention will become more apparent after a reading of the following detailed description taken in conjunction with the drawings, in which.

DETAILED DESCRIPTION OF PREFERRED EMBODIMENTS

Figure 1:
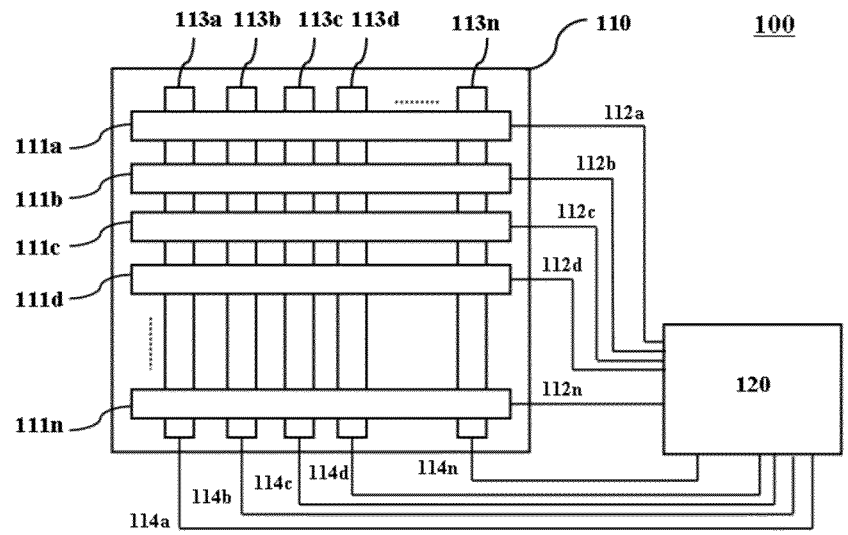
FIG. 1 is a view illustrating the configuration of a conventional capacitance type touch sensing device.
Figure 2:
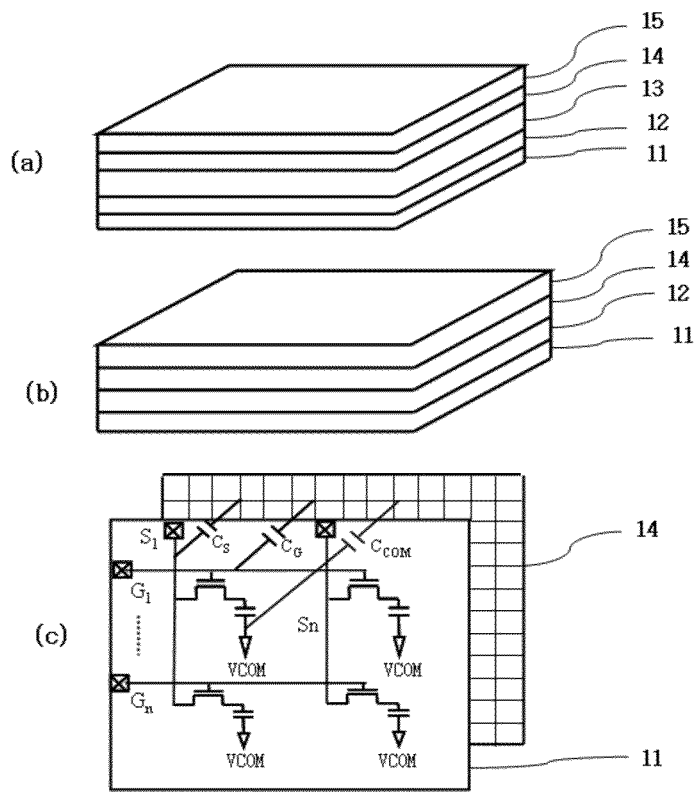
FIG. 2 is a view illustrating the structure of a general touch screen panel.

Reference will now be made in greater detail to preferred embodiments of the invention, an example of which is illustrated in the accompanying drawings. Wherever possible, the same reference numerals will be used throughout the drawings and the description to refer to the same or like parts.

Figure 3:
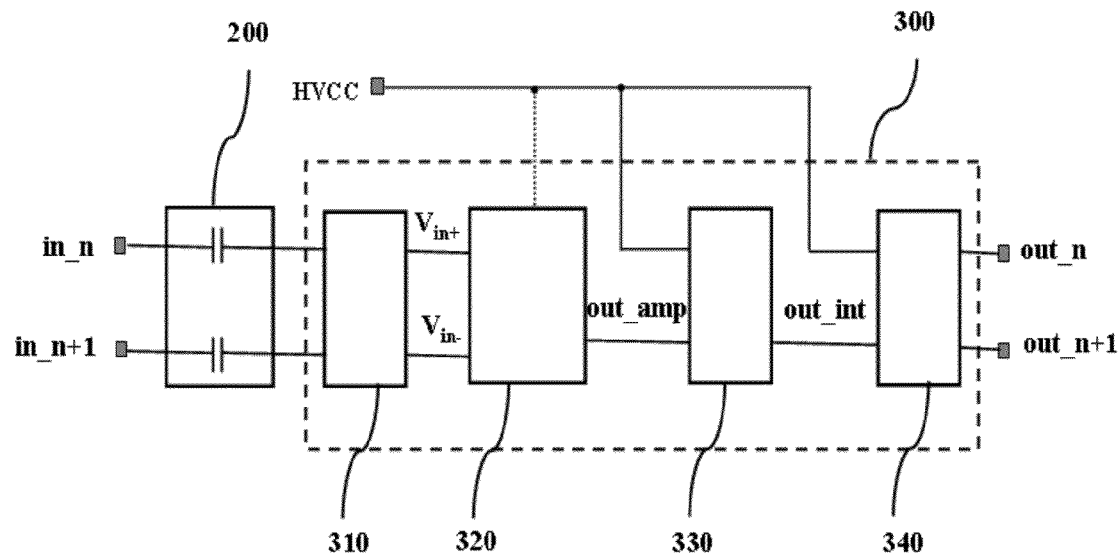
FIG. 3 is a block diagram illustrating the entire configuration of a touch sensing circuit according to an embodiment of the present invention.
Figure 4:
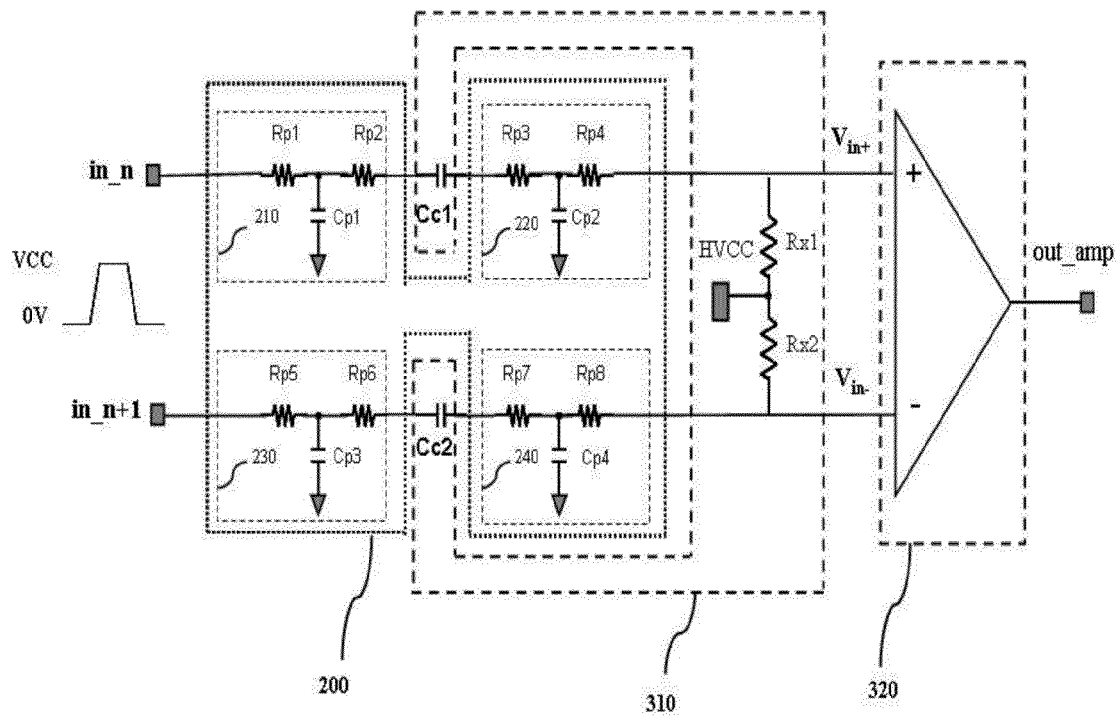
FIG. 4 is a view illustrating the detailed configuration of a differentiator and an amplifier in the touch sensing circuit according to an embodiment of the present invention.

FIG. 3 is a block diagram illustrating the entire configuration of a touch sensing circuit according to an embodiment of the present invention, and FIG. 4 is a view illustrating the detailed configuration of a differentiator and an amplifier in the touch sensing circuit according to an embodiment of the present invention.

As shown in FIGS. 3 and 4, a touch sensing circuit 300 according to an embodiment of the present invention is a device for sensing whether or not a touch is made on a touch screen panel 200, and includes a differentiator 310, an amplifier 320, a detector 330, and a sample/hold amplifier 340.

As shown in FIG. 1, a general touch screen panel is configured with a plurality of driving electrodes arranged in the row direction and a plurality of receiving electrodes arranged in the column direction, wherein the driving electrodes and the receiving electrodes are arranged on mutually different planes. However, for simplification of drawings and convenience of description, FIGS. 3 and 4 according to an embodiment of the present invention illustrate only a first driving electrode 210, a second driving electrode 230, a first receiving electrode 220, and a second receiving electrode 240 among the plurality of driving electrodes and receiving electrodes.

As illustrated in FIG. 4, the first driving electrode 210 includes a parasitic impedance, such as a first parasitic resistance Rp1, a second parasitic resistance Rp2, and a first parasitic capacitance Cp1, and the first receiving electrode 220 includes a parasitic impedance, such as a third parasitic resistance Rp3, a fourth parasitic resistance Rp4, and a second parasitic capacitance Cp2. Also, in a node where the first driving electrode 210 and the first receiving electrode 220 cross each other, a first coupling capacitance Cc1 is formed.

The second driving electrode 230 includes a parasitic impedance, such as a fifth parasitic resistance Rp5, a sixth parasitic resistance Rp6, and a third parasitic capacitance Cp3, and the second receiving electrode 240 includes a parasitic impedance, such as a seventh parasitic resistance Rp7, an eighth parasitic resistance Rp8, and a fourth parasitic capacitance Cp4. Also, in a node where the second driving electrode 230 and the second receiving electrode 240 cross each other, a second coupling capacitance Cc2 is formed.

Accordingly, when a touch is made on the first driving electrode 210 or the second driving electrode 230, a first detection path where a variation in coupling capacitance is detected according to the first driving electrode 210, the first coupling capacitance Cc1, and the first receiving electrode 220 is formed, or a second detection path where a variation in coupling capacitance is detected according to the second driving electrode 230, the second coupling capacitance Cc2, and the second receiving electrode 240 is formed.

Meanwhile, a first driving signal in_n and a second driving signal in_n+1 are alternating signals (i.e. AC signals) having the magnitude of a power supply voltage VCC, and are applied to the first driving electrode 210 and the second driving electrode 230, wherein the first driving signal in_n and second driving signal in_n+1 can be implemented through the use of rectangular pulses, ramped pulses, etc. Also, the first driving signal in_n and the second driving signal in_n+1 may be the same signal.

The differentiator 310 differentiates a first driving signal in_n applied to the first driving electrode 210 and a second driving signal in_n+1 applied to the second driving electrode 230, which is adjacent to the first driving electrode 210, thereby generating a first differentiated signal $V_{in+}$ and a second differentiated signal $V_{in-}$.

The differentiator 310 may include a first differentiator configured with a first coupling capacitance Cc1 and a first differential resistance Rx1, and a second differentiator configured with a second coupling capacitance Cc2 and a second differential resistance Rx2.

The first coupling capacitance Cc1 is formed in a node where the first driving electrode 210 of the touch screen panel 200 and the first receiving electrode 220 cross each other, wherein a first terminal of the first coupling capacitance Cc1 is connected to the first driving electrode 210, and a second terminal of the first coupling capacitance Cc1 is connected to the first receiving electrode 220.

A first terminal of the first differential resistance Rx1 is connected in common to a non-inverting input terminal (+) of the amplifier 320 and to the first receiving electrode 220, which is connected to the second terminal of the first coupling capacitance Cc1, while a second terminal of the first differential resistance Rx1 is connected to a second terminal of the second differential resistance Rx2. Also, a reference voltage HVCC is applied to a node where the second terminal of the first differential resistance Rx1 and the second terminal of the second differential resistance Rx2 are connected in common.

The second coupling capacitance Cc2 is formed in a node where the second driving electrode 230 and the second receiving electrode 240 cross each other, wherein a first terminal of the second coupling capacitance Cc2 is connected to the second driving electrode 230, and a second terminal of the second coupling capacitance Cc2 is connected to the second receiving electrode 240.

A first terminal of the second differential resistance Rx2 is connected in common to an inverting input terminal (−) of the amplifier 320 and to the second receiving electrode 240, connected to the second terminal of the second coupling capacitance Cc2, while the second terminal of the second differential resistance Rx2 is connected to the second terminal of the first differential resistance Rx1.

Equations 1 and 2 express magnitudes of the first differentiated signal $V_{in+}$ and second differentiated signal $V_{in-}$.

$$Vin+= \left(VCC \cdot \left(\frac{ZCp1}{Rp1+ZCp1}\right) \cdot \left(\frac{ZCp2}{Rp2+ZCc1+Rp3+ZCp2}\right) - HVCC\right) \cdot \frac{Rx1}{Rp4+Rx1} \quad (1)$$

$$Vin-= \left(VCC \cdot \left(\frac{ZCp3}{Rp5+ZCp3}\right) \cdot \left(\frac{ZCp4}{Rp6+ZCc2+Rp7+ZCp4}\right) - HVCC\right) \cdot \frac{Rx2}{Rp8+Rx2} \quad (2)$$

When the driving signals in_n and in_n+1, which are alternating signals (i.e. AC signals), are input, the impedances of the parasitic capacitances Cp1 to Cp4, coupling capacitances Cc1 and Cc2, and parasitic resistances Rp1 to Rp8 are changed. Signals divided by the parasitic capacitances Cp1 to Cp4, coupling capacitances Cc1 and Cc2, and parasitic resistances Rp1 to Rp8, the impedances of which are changed, as described above, are changed in magnitudes thereof through the first differential resistance Rx1 and second differential resistance Rx2, so that the magnitudes of the first differentiated signal $V_{in+}$ and second differentiated signal $V_{in-}$.

Generally, according to the material characteristics or size of a touch screen panel (TSP) or according to the configurations or materials of a touch screen substrate and a display substrate, parasitic resistances and parasitic capacitances have eigenvalues. Therefore, it is very difficult to adjust the magnitudes of the first differentiated signal $V_{in+}$ and second differentiated signal $V_{in-}$ through a variation in the values of a parasitic resistance and a parasitic capacitance.

For this reason, according to the present invention, the magnitudes of first differentiated signal $V_{in+}$ and second differentiated signal $V_{in-}$, which are input signals of the amplifier 320, are adjusted by adjusting the values of the first differential resistance Rx1, second differential resistance Rx2, and reference voltage HVCC.

Referring to Equation 1, as the value of the first differential resistance Rx1 is changed, a voltage division ratio of the power supply voltage VCC and the reference voltage HVCC is changed, so that the magnitude of the first differentiated signal $V_{in+}$ can be adjusted.

Also, referring to Equation 2, as the value of the second differential resistance Rx2 is changed, a voltage division ratio of the power supply voltage VCC and the reference voltage HVCC is changed, so that the magnitude of the second differentiated signal $V_{in-}$ can be adjusted.

Meanwhile, when a voltage equal to or less than the reference voltage HVCC is applied to a common node of the second terminal of the first differential resistance Rx1 and the second terminal of the second differential resistance Rx2, the value of a voltage component according to the reference voltage HVCC is changed in Equations 1 and 2, so that it is necessary to enlarge the variation of the first differential resistance Rx1 and second differential resistance Rx2 in order to obtain the first differentiated signal $V_{in+}$ and second differentiated signal $V_{in-}$ having desired magnitudes.

According to an embodiment of the present invention, elements representing the first differential resistance Rx1 and second differential resistance Rx2 may be configured to have variable values, instead of having fixed values. A variable resistor can be manufactured with a diffusion layer or polysilicon layer, which is widely used in a semiconductor manufacturing procedure, and the resistance value of the variable resistor can vary in such a manner as to establish the physical width, length, etc. of each resistor, and then to contact a metal line at a proper point of the length.

Meanwhile, a transistor may be used to make the variable resistor according to an embodiment of the present invention. A variation of a resistance value using a transistor depends on not only a ratio of the width of gate material to the area thereof, but also a gate voltage of the transistor, a threshold voltage thereof, a mobility, a thickness of a gate oxide film, etc. Therefore, by appropriately changing these factors, it is possible to vary a resistance value with a transistor. In the following description, it should be noted that every elements expressed as resistors for convenience of description may be variable resistors as described above.

Also, as shown in Equations 1 and 2, it is preferable that the reference voltage HVCC has a half value of the power supply voltage VCC, but it goes without saying that the purpose of the present invention can be achieved although the reference voltage HVCC has any value between the power supply voltage VCC and the ground according to circumstances.

As described above, according to the present invention, the first differential resistance Rx1, the second differential resistance Rx2, and the terminal of the reference voltage HVCC are connected with each other, and the reference voltage HVCC is applied to a common node of the first differential resistance Rx1 and the second differential resistance Rx2, so that it is possible to adjust the first differentiated signal $V_{in+}$ and second differentiated signal $V_{in-}$ to have desired magnitudes, even with a small variation in the first differential resistance Rx1 and the second differential resistance Rx2.

Also, through this, even when the configuration of a touch screen panel, a touch screen substrate or a display substrate is changed, it is possible to effectively sense whether or not a touch is made on the touch screen panel 200 through the use of changed values of the first coupling capacitance Cc1 and second coupling capacitance Cc2.

It is preferable that the amplifier 320 is configured with a differential amplifier, which receives the first differentiated signal $V_{in+}$ through a non-inverting input terminal (+) thereof, receives the second differentiated signal $V_{in-}$ through an inverting input terminal (−) thereof, amplifies the received differentiated signals, and then outputs a amplified signal out_amp.

The magnitude of the amplified signal out_amp, which is an output signal of the amplifier 320, is calculated by the difference in magnitude between the first differentiated signal $V_{in+}$ and second differentiated signal $V_{in-}$, as shown in the following equation.

$$\text{out\_amp} = Av(V_{in+} - V_{in-}) \quad (3)$$

In Equation 3, "Av" represents a voltage gain of the amplifier 320.

Differently from the prior art wherein changes in the coupling capacitance in one touch line are compared and it is sensed whether or not a touch is made on a touch screen panel, the present invention has a characteristic in that relative changes in coupling capacitance between two adjacent touch lines are compared and it is sensed whether or not a touch is made.

That is, when a finger is touched on a touch screen panel, the coupling capacitance value of a touched line and the coupling capacitance value of an untouched line adjacent to the touched line are compared, the coupling capacitance value changed by the touch is read, the read value is processed through an analog-to-digital converter and a processor, and thus touched coordinates in the touch screen panel are read.

Meanwhile, when two adjacent lines are both touched while wherein one line is more touched to make a great variation in coupling capacitance, and the other line is relatively less touched to make a small variation in coupling capacitance, changed coupling capacitances of the two lines are read and processed, so that the touched coordinates in the touch screen panel are obtained.

Figure 5:
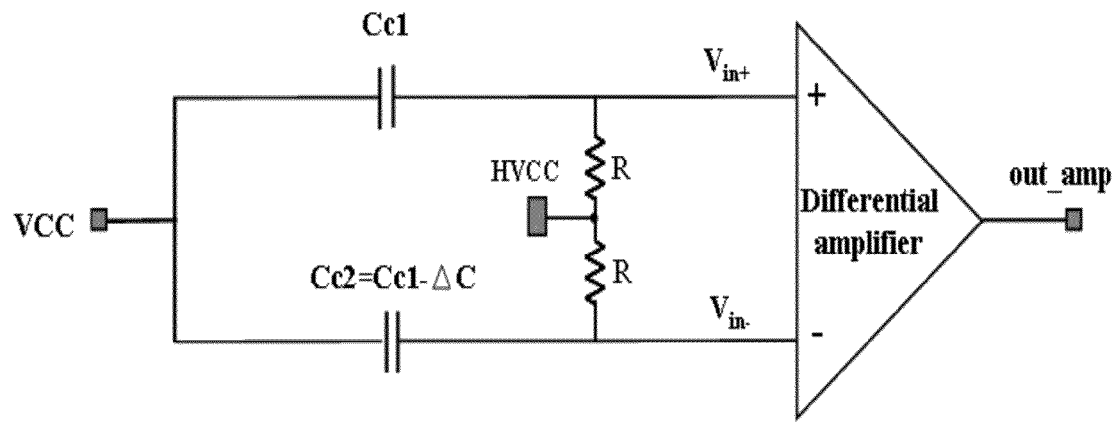
FIG. 5 is a view explaining a conception of an operation of reading the coupling capacitance values of two adjacent lines in a touch sensing circuit according to an embodiment of the present invention.

FIG. 5 is a view explaining a conception of an operation of reading the coupling capacitance values of two adjacent lines in a touch sensing circuit according to an embodiment of the present invention. For simplification and convenience of description, parasitic resistances and parasitic capacitances are omitted in FIG. 5.

The first differentiated signal $V_{in+}$ and second differentiated signal $V_{in-}$, which are input voltages of a differential amplifier illustrated in FIG. 5, and a amplified signal out_amp, which is an output voltage of the differential amplifier, are obtained by Equations 4-1 to 4-3.

$$V_{in+} = HVCC + R \times Cc1 \times \frac{dV}{dt} \quad (4\text{-}1)$$

$$V_{in-} = HVCC + R \times (Cc1 - \Delta C) \times \frac{dV}{dt} \quad (4\text{-}2)$$

$$\text{out\_amp} = V_{in+} - V_{in-} = R \times \Delta C \times \frac{dV}{dt} \quad (4\text{-}3)$$

Accordingly, it is possible to read a difference ΔC of changes of coupling capacitances between two adjacent lines using the differential amplifier, and to sense whether or not a touch is made on a touch screen panel through the user of the read difference. The polarity of the amplified signal out_amp represents which one of the first coupling capacitance Cc1 and second coupling capacitance Cc2 has been touched.

Generally, an amplifier has a characteristic that the bandwidth thereof becomes narrower as a gain increase, and the bandwidth thereof becomes wider as the gain decreases. Recently, as panels have become larger in size, a differential amplifier capable of operating at a high speed is required in order to drive a high-speed multi-touch capable system.

When a differential amplifier of operating at a high speed, as described above, is used, it is impossible to greatly increase the gain of the differential amplifier, so that a gain amplifier may be additionally used in compensation for a limited gain of the differential amplifier.

Figure 6:
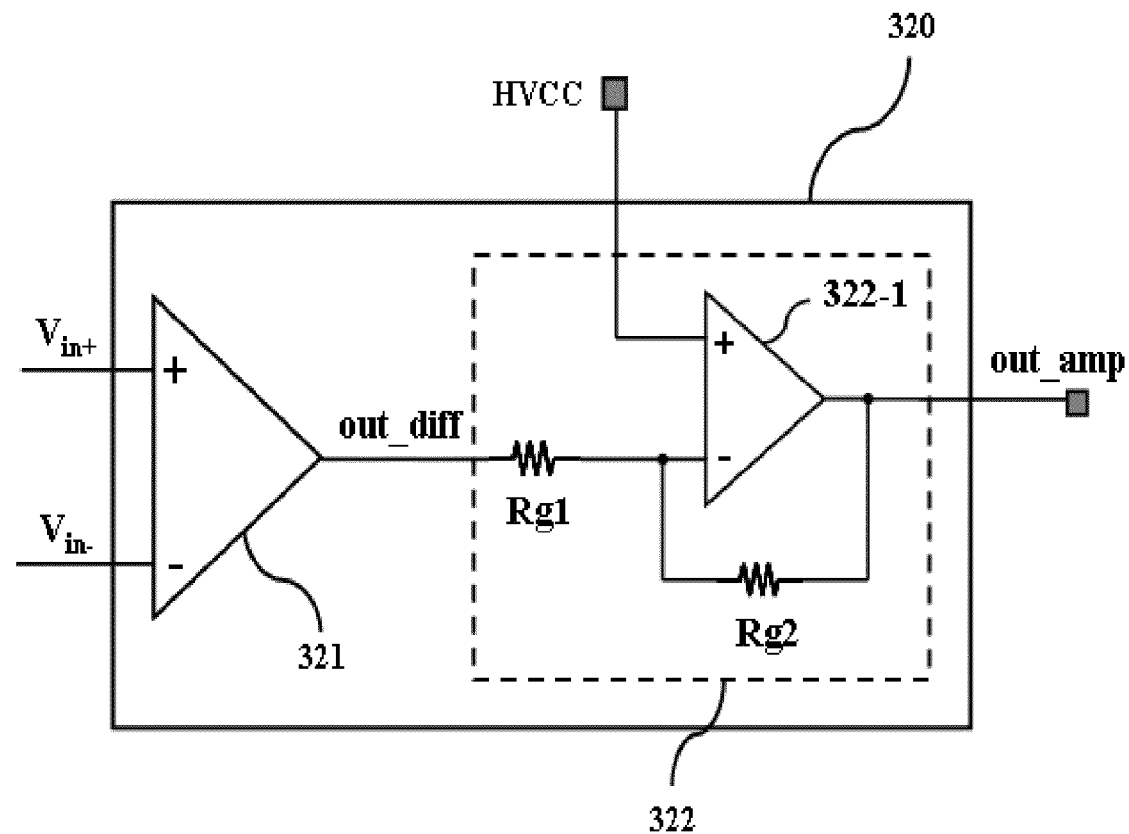
FIG. 6 is a view illustrating the configuration of an amplifier of a touch sensing circuit according to another embodiment of the present invention.

FIG. 6 is a view illustrating the configuration of an amplifier of a touch sensing circuit according to another embodiment of the present invention.

Referring to FIG. 6, the amplifier 320 of the touch sensing circuit according to another embodiment of the present invention may include a differential amplifier 321 and a gain amplifier 322.

The differential amplifier 321 receives the first differentiated signal $V_{in+}$ through a non-inverting input terminal (+) thereof, receives the second differentiated signal $V_{in-}$ through an inverting input terminal (−) thereof, amplifies the received differentiated signals, and then outputs a differential output signal out_diff. The gain amplifier 322 receives the differential output signal out_diff which is an output of the differential amplifier 321, adjusts the gain of the received signal, and outputs the amplified signal out_amp which is a gain-adjusted signal.

The gain amplifier 322 includes a gain operational amplifier 322-1, a first gain resistance Rg1, and a second gain resistance Rg2.

The gain operational amplifier 322-1 receives the reference voltage HVCC through a non-inverting input terminal (+) thereof, and receives the differential output signal out_diff, which is applied via the first gain resistance Rg1, through an inverting input terminal (−) thereof.

The first gain resistance Rg1 has a first terminal connected to the output terminal of the differential amplifier 321, and a second terminal connected to the inverting input terminal (−) of the gain operational amplifier 322-1.

The second gain resistance Rg2 has a first terminal connected to the output terminal of the gain operational amplifier 322-1, and a second terminal connected in common to the second terminal of the first gain resistance Rg1 and to the inverting input terminal (−) of the gain operational amplifier 322-1.

The gain amplifier 322 corresponds to a circuit of amplifying the differential output signal out_diff, which is an output of the differential amplifier 321, by a ratio of the first gain resistance Rg1 and the second gain resistance Rg2. The magnitude of the amplified signal out_amp, which is an output of the gain amplifier 322, is calculated by the following equation.

$$\text{out\_amp} = \frac{Rg2}{Rg1}(HVCC - \text{out\_diff}) \quad (5)$$

Meanwhile, according to an embodiment of the present invention, the gain amplifier 322 may be modified and used to have a structure in which a differential input is available, depending on the configuration of the differential amplifier 321 and the configuration of a detector 330.

Figure 7:
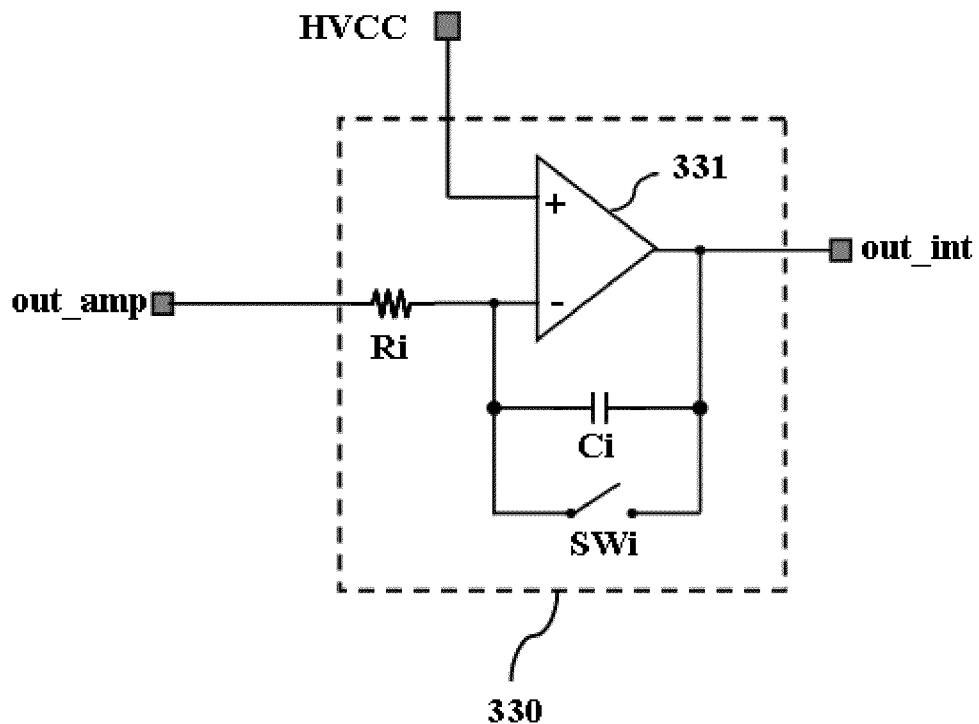
FIG. 7 is a view illustrating a detailed configuration of a detector in a touch sensing circuit according to an embodiment of the present invention.

FIG. 7 is a view illustrating a detailed configuration of a detector in a touch sensing circuit according to an embodiment of the present invention.

The detector 330 receives a amplified signal out_amp, which is an alternating signal (i.e. AC signal), and converts the received signal into a direct signal, thereby outputting a detection signal out_int.

The detector 330 may be implemented with an integrator, which includes an integrating amplifier 331, an integration resistance Ri, an integration capacitance Ci, and an integration switch SWi.

The integrating amplifier 331 receives the reference voltage HVCC through a non-inverting input terminal (+) thereof, and receives the amplified signal out_amp, which is an output of the amplifier 320 and is applied via the integration resistance Ri, through an inverting input terminal (−) thereof.

A first terminal of the integration resistance Ri is connected to the output terminal of the amplifier 320, and a second terminal of the integration resistance Ri is connected to the inverting input terminal (−) of the integrating amplifier 331. A first terminal of the integration capacitance Ci is connected to the output terminal of the integrating amplifier 331, and a second terminal of the integration capacitance Ci is connected to the inverting input terminal (−) of the integrating amplifier 331. The integration switch SWi is connected in parallel to the integration capacitance Ci, thereby resetting the integration capacitance Ci.

The detection signal out_int, which is an output of the detector 330 implemented with an integrator, may be obtained by the following equation.

$$\text{out\_int} = \frac{1}{Ri \cdot Ci} \int \frac{d(\text{out\_amp})}{dt} \quad (6)$$

The detector 330 implemented with an integrator may be modified and used to have a structure in which a differential input is available, depending on the configuration of the amplifier 320 and the configuration of a sample/hold amplifier 340.

Figure 8:
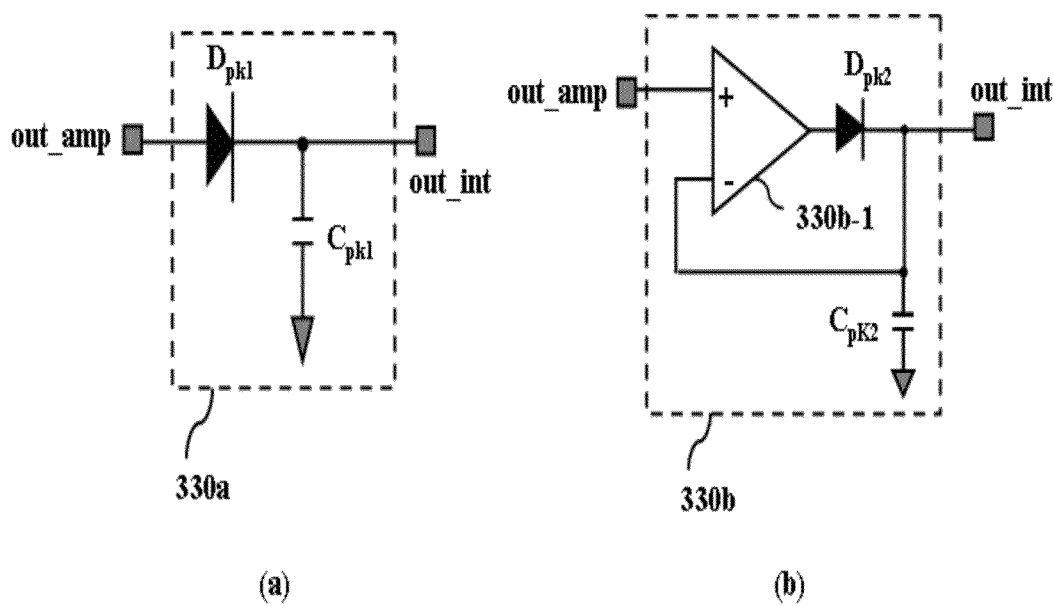
FIG. 8 is a view illustrating the configurations of detectors in touch sensing circuits according to other embodiments of the present invention.

FIG. 8 is a view illustrating the configurations of detectors in touch sensing circuits according to other embodiments of the present invention.

As shown in FIG. 8, the detector 330 in the touch sensing circuit according to the present invention may be implemented with a passive peak detector 330a or an active peak detector 330b.

The passive peak detector 330a shown in (a) of FIG. 8 is configured with a first peak diode $D_{pk}1$ and a first peak capacitance $C_{pk}1$, wherein a first terminal of the first peak diode $D_{pk}1$ is connected to the output terminal of the amplifier 320, a first terminal of the first peak capacitance $C_{pk}1$ is connected to a second terminal of the first peak diode $D_{pk}1$, and a second terminal of the first peak capacitance $C_{pk}1$ is grounded.

Meanwhile, the active peak detector 330b shown in (b) of FIG. 8 is configured with a peak amplifier 330b-1, a second peak diode $D_{pk}2$ and a second peak capacitance $C_{pk}2$, wherein the peak amplifier 330b-1 receives the amplified signal out_amp through a non-inverting input terminal (+) of the peak amplifier 330b-1, and the second peak diode $D_{pk}2$ is connected to the output terminal of the peak amplifier 330b-1 through a first terminal of the second peak diode $D_{pk}2$. In addition, a first terminal of the second peak capacitance $C_{pk}2$ is connected in common to a second terminal of the second peak diode $D_{pk}2$ and to an inverting input terminal (−) of the peak amplifier 330b-1, and a second terminal of the second peak capacitance $C_{pk}2$ is grounded.

Figure 9:
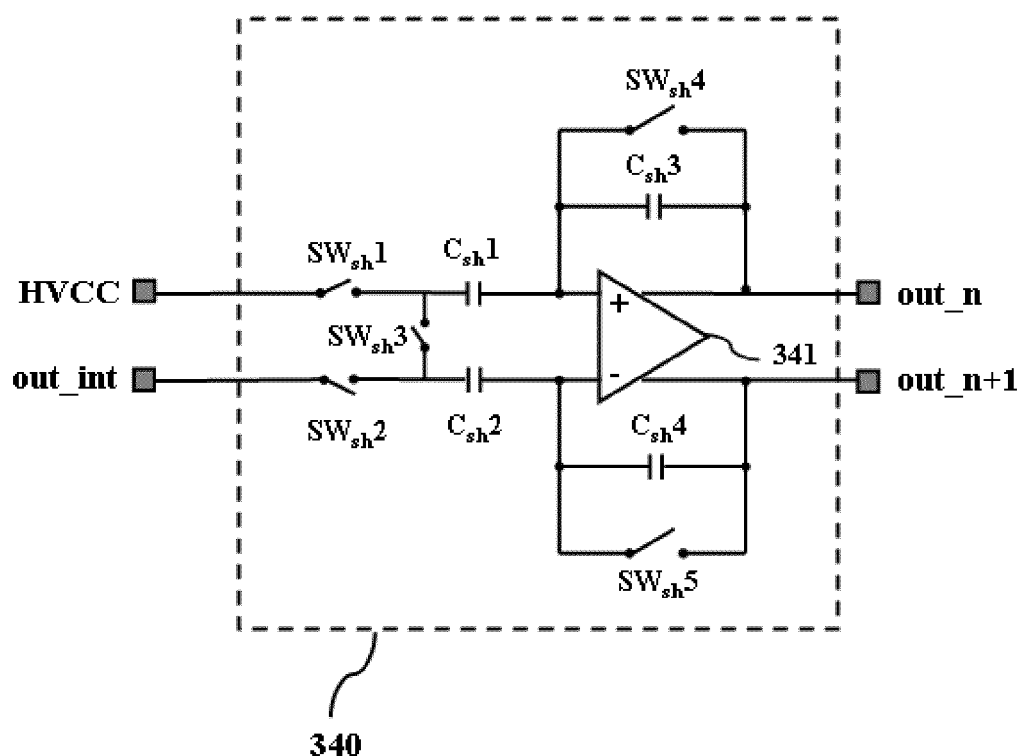
FIG. 9 is a view illustrating the configuration of a sample/hold amplifier in a touch sensing circuit according to an embodiment of the present invention.

FIG. 9 is a view illustrating the configuration of a sample/hold amplifier in a touch sensing circuit according to an embodiment of the present invention.

As shown in FIG. 9, the sample/hold amplifier 340 receives the reference voltage HVCC through a first input terminal of the sample/hold amplifier 340, and receives the detection signal out_int, which is an output of the detector, through a second terminal of the sample/hold amplifier 340.

According to the operations of sample/hold switches $SW_{sh}1$ to $SW_{sh}5$ which are switched on or off in response to a control signal (not shown), sample/hold capacitances $C_{sh}1$ to $C_{sh}4$, and a sample/hold operational amplifier 341, the sample/hold amplifier 340 amplifies and holds the reference voltage HVCC and the detection signal out_int, generates sample/hold signals out_n and out_n+1, and then transfers the sample/hold signals out_n and out_n+1 to an analog-to-digital converter (ADC).

Meanwhile, the sample/hold amplifier may be implemented within an external analog-to-digital converter (ADC), instead of within the touch sensing circuit 300.

As described above, according to the present invention, the touch sensing circuit uses a differential amplifier, from which a common mode is removed, in sensing a variation in coupling capacitance, so that it is possible to remove common mode noise on display, thereby enabling a high-speed multi-touch operation, even in an on-cell type touch screen panel.

As is apparent from the above description, the present invention provides a touch sensing circuit, which uses a differential amplifier from which a common mode is removed in sensing a variation in coupling capacitance, so that it is possible to effectively remove noise on display.

In addition, according to the present invention, a gain amplifier is used in addition to a differential amplifier according to necessity so as to compensate the gain of the differential amplifier which operates at a high speed, so that it is possible to achieve a high-speed multi-touch operation in a large-size panel.

Although the preferred embodiments of the present invention have been described for illustrative purposes, those skilled in the art will appreciate that various modifications, additions and substitutions are possible, without departing from the scope and the spirit of the invention as disclosed in the accompanying claims.

What is claimed is:

1. A touch sensing circuit for sensing a coupling capacitance value changed by a touch on a touch screen panel and sensing whether a touch is made on the touch screen panel, wherein the touch screen panel comprises a plurality of driving electrodes and a plurality of receiving electrodes, wherein the plurality of driving electrodes comprise a first driving electrode and a second driving electrode, and wherein the plurality of receiving electrodes comprise a first receiving electrode and a second receiving electrode, the touch sensing circuit comprising:

a first touch line configured to be driven by a first driving signal;

a second touch line configured to be driven by a second driving signal, wherein the second touch line is adjacent to the first touch line;

a differentiator comprising:

a first differentiator configured to generate a first differentiated signal and output the first differentiated signal to an amplifier via the first touch line, wherein the first differentiator comprises a first coupling capacitance and a first differential resistance, wherein the first coupling capacitance is positioned on the first touch line between the first driving electrode and the first receiving electrode, and wherein the first differential resistance comprises a first terminal connected to the first touch line between the first receiving electrode and the amplifier; and a second differentiator configured to generate a second differentiated signal and output the second differentiated signal to the amplifier via the second touch line, wherein the second differentiator comprises a second coupling capacitance and a second differential resistance, wherein the second coupling capacitance is positioned on the second touch line between the second driving electrode and the second receiving electrode, and wherein the second differential resistance comprises a first terminal connected to the second touch line between the second receiving electrode and the amplifier, the amplifier configured to receive the first differentiated signal from the first differentiator via the first touch line, receive the second differentiated signal from the second differentiator via the second touch line, and output an amplified signal; and a detector configured to receive the amplified signal and output a detection signal.

2. The touch sensing circuit according to claim 1, wherein, in the differentiator, magnitudes of the first differentiated signal and the second differentiated signal can be adjusted by adjusting magnitudes of the first differential resistance and the second differential resistance.

3. The touch sensing circuit according to claim 1, wherein a second terminal of the first differential resistance and a second terminal of the second differential resistance connected with each other, and
- a reference voltage is applied to a connection node between the second terminal of the first differential resistance and the second terminal of the second differential resistance.

4. The touch sensing circuit according to claim 1, wherein the amplifier comprises a differential amplifier, and wherein the differential amplifier is configured to receive the first differentiated signal through a non-inverting input terminal of the differential amplifier, receive the second differentiated signal through an inverting input terminal of the differential amplifier, and output the amplified signal.

5. The touch sensing circuit according to claim 4, wherein the detector comprises an integrator, the integrator comprising:
- an integrating amplifier configured to receive the reference voltage through a non-inverting input terminal of the integrating amplifier;
- an integration resistance comprising a first terminal and a second terminal, wherein the first terminal of the integration resistance is connected to an output terminal of the amplifier, and wherein the second terminal of the integration resistance is connected to an inverting input terminal of the integrating amplifier;
- an integration capacitance comprising a first terminal and a second terminal, wherein the first terminal of the integration capacitance is connected to an output terminal of the integrating amplifier, and wherein the second terminal of the integration capacitance is connected in common to the second terminal of the integration resistance and to the inverting input terminal of the integrating amplifier; and
- an integration switch connected in parallel to the integration capacitance.

6. The touch sensing circuit according to claim 4, wherein the detector is configured with a passive peak detector, the passive peak detector comprising:
- a first peak diode having a first terminal connected to an output terminal of the amplifier; and
- a first peak capacitance having a first terminal connected to a second terminal of the first peak diode, and a second terminal which is grounded, thereby enabling a high-speed multi-touch operation.

7. The touch sensing circuit according to claim 4, wherein the detector is configured with an active peak detector, the active peak detector comprising:
- a peak amplifier configured to receive the amplified signal through a non-inverting input terminal thereof;
- a second peak diode having a first terminal connected to an output terminal of the peak amplifier; and
- a second peak capacitance having a first terminal connected in common to a second terminal of the second peak diode and to an inverting input terminal of the peak amplifier, and a second terminal is grounded, thereby enabling a high-speed multi-touch operation.

8. The touch sensing circuit according to claim 1, wherein the amplifier comprises:
- a differential amplifier configured to receive the first differentiated signal through a non-inverting input terminal of the differential amplifier, receive the second differentiated signal through an inverting input terminal of the differential amplifier, and amplify a difference between the first and second differentiated signals; and
- a gain amplifier configured to receive an output signal of the differential amplifier, adjust a gain of the output signal of the differential amplifier, and output the amplified signal.

9. The touch sensing circuit according to claim 8, wherein the gain amplifier comprises:
- a gain operational amplifier configured to receive the reference voltage through a non-inverting input terminal of the gain operational amplifier;
- a first gain resistance comprising a first terminal and a second terminal, wherein the first terminal of the first gain resistance is connected to an output terminal of the differential amplifier, and wherein the second terminal of the first gain resistance is connected to an inverting input terminal of the gain operational amplifier; and
- a second gain resistance comprising a first terminal and a second terminal, wherein the first terminal of the second gain resistance is connected to an output terminal of the gain operational amplifier, and the second terminal of the second gain resistance is connected in common to the second terminal of the first gain resistance and to the inverting input terminal of the gain operational amplifier.

10. The touch sensing circuit according to claim 8, wherein the detector comprises an integrator, the integrator comprising:
- an integrating amplifier configured to receive the reference voltage through a non-inverting input terminal of the integrating amplifier;
- an integration resistance comprising a first terminal and a second terminal, wherein the first terminal of the integration resistance is connected to an output terminal of the amplifier, and wherein the second terminal of the integration resistance is connected to an inverting input terminal of the integrating amplifier;
- an integration capacitance comprising a first terminal and a second terminal, wherein the first terminal of the integration capacitance is connected to an output terminal of the integrating amplifier, and wherein the second terminal of the integration capacitance is connected in common to the second terminal of the integration resistance and to the inverting input terminal of the integrating amplifier; and
- an integration switch connected in parallel to the integration capacitance.

11. The touch sensing circuit according to claim 8, wherein the detector is configured with a passive peak detector, the passive peak detector comprising:
- a first peak diode having a first terminal connected to an output terminal of the amplifier; and
- a first peak capacitance having a first terminal connected to a second terminal of the first peak diode, and a second terminal which is grounded, thereby enabling a high-speed multi-touch operation.

12. The touch sensing circuit according to claim 8, wherein the detector is configured with an active peak detector, the active peak detector comprising:
- a peak amplifier configured to receive the amplified signal through a non-inverting input terminal thereof;
- a second peak diode having a first terminal connected to an output terminal of the peak amplifier; and
- a second peak capacitance having a first terminal connected in common to a second terminal of the second peak diode and to an inverting input terminal of the peak amplifier, and a second terminal is grounded, thereby enabling a high-speed multi-touch operation.

\* \* \* \* \*